United States Patent
Kugimiya et al.

(10) Patent No.: US 6,783,844 B2
(45) Date of Patent: Aug. 31, 2004

(54) POLYPROPYLENE RESIN FOAM-MOLDED ARTICLE

(75) Inventors: Youichi Kugimiya, Chiba (JP); Kouichi Honda, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 0 days.

(21) Appl. No.: 10/196,192

(22) Filed: Jul. 17, 2002

(65) Prior Publication Data

US 2004/0013846 A1 Jan. 22, 2004

(51) Int. Cl.⁷ .............................. B32B 5/20; B32B 3/00
(52) U.S. Cl. ..................... 428/318.8; 428/68; 428/71; 428/76; 428/318.6; 428/319.3; 428/86
(58) Field of Search .................... 428/68, 71, 76, 428/318.6, 319.3, 86, 318.8

(56) References Cited

U.S. PATENT DOCUMENTS

| | | | |
|---|---|---|---|
| 3,583,123 A | * | 6/1971 | Holmgren et al. ......... 52/588.1 |
| 4,016,118 A | | 4/1977 | Hamada et al. |
| 4,140,732 A | | 2/1979 | Schnetger et al. |
| 4,252,914 A | | 2/1981 | Halasa et al. |
| 4,267,080 A | | 5/1981 | Yokoyama et al. |
| 4,339,487 A | * | 7/1982 | Mullet .................... 428/71 |
| 4,410,649 A | | 10/1983 | Cieloszyk |
| 4,459,385 A | | 7/1984 | McCullough, Jr. |
| 4,508,872 A | | 4/1985 | McCullough, Jr. |
| 4,532,280 A | | 7/1985 | Kobayashi et al. |
| 4,889,888 A | | 12/1989 | Bassi et al. |
| 4,954,291 A | | 9/1990 | Kobayashi et al. |
| 5,023,300 A | | 6/1991 | Huff et al. |
| 5,049,605 A | | 9/1991 | Rekers |
| 5,073,598 A | | 12/1991 | Anzini |
| 5,230,934 A | | 7/1993 | Sakano et al. |

(List continued on next page.)

FOREIGN PATENT DOCUMENTS

| | | |
|---|---|---|
| EP | 0 225 693 | 6/1987 |
| EP | 0 276 323 | 8/1988 |
| EP | 0 457 455 | 11/1991 |
| EP | 0 700 943 | 3/1996 |

(List continued on next page.)

OTHER PUBLICATIONS

U.S. patent application Ser. No. 09/615,740, Horikoshi et al., filed Jul. 13, 2000.
U.S. patent application Ser. No. 09/670,273, Ando et al., filed Sep. 27, 2000.
U.S. patent application Ser. No. 10/070,354, Nakashima et al., filed Mar. 6, 2002.
U.S. patent application Ser. No. 10/140,067, Shinizu et al., filed May 8, 2002.

*Primary Examiner*—Terrel Morris
*Assistant Examiner*—Hai Vo
(74) *Attorney, Agent, or Firm*—Leydig, Voit & Mayer, Ltd.

(57) ABSTRACT

Provided is a polypropylene resin foam-molded article which has a rib having a relatively small thickness and which has an improved strength at a boundary part between a main body part and the rib part without increasing a thickness of the rib part. The polypropylene resin foam-molded article is obtained by molding a material for a foam-molded article using a polypropylene resin, wherein the molded article comprises a main body part and a rib part provided vertically to the main body part; the rib part has a thickness ($T_r$) of 3 mm or less, or a thickness ratio ($T_r/T_b$) of a thickness of the rib part ($T_r$) to a thickness of the main body part ($T_b$) is 0.8 or less; the main body part and the rib part each comprise a non-foamed surface layer and an intermediate layer having a foamed structure; and the intermediate layer in the main body part is connected to the intermediate layer in the rib part. It is molded from the material for a foam-molded article using a polypropylene resin in which a melt flow rate and a melt tension satisfy a fixed relation.

7 Claims, 3 Drawing Sheets

U.S. PATENT DOCUMENTS

| | | | |
|---|---|---|---|
| 5,232,993 A | | 8/1993 | Winter et al. |
| 5,298,561 A | | 3/1994 | Cecchin et al. |
| 5,302,454 A | | 4/1994 | Cecchin et al. |
| 5,470,898 A | | 11/1995 | Syed |
| 5,504,171 A | | 4/1996 | Etherton et al. |
| 5,516,848 A | | 5/1996 | Canich et al. |
| 5,539,056 A | | 7/1996 | Yang et al. |
| 5,556,821 A | | 9/1996 | Aida et al. |
| 5,654,372 A | | 8/1997 | Sadatoshi et al. |
| 5,725,940 A | * | 3/1998 | Sakai et al. ............... 428/318.6 |
| 5,756,609 A | | 5/1998 | Cohen |
| 5,856,400 A | | 1/1999 | Matsumura et al. |
| 5,891,235 A | | 4/1999 | Suzuki et al. |
| 5,962,595 A | | 10/1999 | Dolle et al. |
| 5,972,491 A | * | 10/1999 | Kimura et al. ........... 428/318.6 |
| 6,005,034 A | | 12/1999 | Hayashida et al. |
| 6,107,388 A | | 8/2000 | Sanpei et al. |
| 6,110,549 A | | 8/2000 | Hamada et al. |
| 6,156,845 A | * | 12/2000 | Saito et al. ................. 525/240 |
| 6,201,069 B1 | | 3/2001 | Fukazawa et al. |
| 6,303,698 B1 | | 10/2001 | Ushioda et al. |
| 6,326,432 B1 | | 12/2001 | Fujita et al. |
| 6,395,071 B1 | | 5/2002 | Niijima et al. |
| 6,410,662 B1 | | 6/2002 | Ushioda et al. |
| 6,429,262 B1 | | 8/2002 | Akitaya et al. |

FOREIGN PATENT DOCUMENTS

| | | |
|---|---|---|
| EP | 0 739 941 | 10/1996 |
| EP | 0 751 160 | 1/1997 |
| EP | 0 790 262 | 8/1997 |
| EP | 0 856 526 | 8/1998 |
| EP | 0 863 183 | 9/1998 |
| EP | 0 864 589 | 9/1998 |
| EP | 0 864 589 A2 | 9/1998 |
| EP | 0 885 926 | 12/1998 |
| GB | 2 309 973 | 8/1997 |
| JP | 56-72042 | 6/1981 |
| JP | 57-63350 | 4/1982 |
| JP | 63-112612 | 5/1988 |
| JP | 2-22031 | 1/1990 |
| JP | 2-252525 | 10/1990 |
| JP | 2-258854 | 10/1990 |
| JP | 3-6251 | 1/1991 |
| JP | 3-205439 | 9/1991 |
| JP | 4-114045 | 4/1992 |
| JP | 5-117342 | 5/1993 |
| JP | 5-331327 | 12/1993 |
| JP | 6-93061 | 4/1994 |
| JP | 6-145268 | 5/1994 |
| JP | 6-239918 | 8/1994 |
| JP | 7-30145 | 4/1995 |
| JP | 7-102126 | 4/1995 |
| JP | 7-127217 | 5/1995 |
| JP | 8-27238 | 1/1996 |
| JP | 8-41278 | 2/1996 |
| JP | 8-41279 | 2/1996 |
| JP | 8-59766 | 3/1996 |
| JP | 8-67783 | 3/1996 |
| JP | 8-104792 | 4/1996 |
| JP | 8-239547 | 9/1996 |
| JP | 8-300391 | 11/1996 |
| JP | 9-77953 | 3/1997 |
| JP | 9-300446 | 11/1997 |
| JP | 10-53628 | 2/1998 |
| JP | 10-87744 | 4/1998 |
| JP | 10-128795 | 5/1998 |
| JP | 10-316727 | 12/1998 |
| JP | 10-316810 | 12/1998 |
| JP | 2001-114148 | 4/2001 |
| JP | 2001-226514 | 8/2001 |
| WO | WO97/14725 | 4/1997 |
| WO | WO97/19135 | 5/1997 |
| WO | WO98/54257 | 12/1998 |
| WO | WO 98/54258 | 12/1998 |

\* cited by examiner

POLYPROPYLENE RESIN FOAM-MOLDED ARTICLE

BACKGROUND OF THE INVENTION

1. Field of the Invention

The present invention relates to a foam-molded article using a polypropylene resin. More specifically, it relates to a polypropylene resin foam-molded article which is excellent in impact resistance, heat insulating property, stiffness and lightweight property and which is suitable for use in automobile parts, parts of electric appliances and heat/cold insulating containers.

2. Description of the Related Art

A polypropylene resin is a thermoplastic resin widely used for various molded articles due to its excellent mechanical properties and chemical resistance and cheapness. Efforts have been made to use a polypropylene resin in the field of foam-molded articles.

Methods generally used for making a foam-molded article of a polypropylene resin are a method in which a mold is charged with pre-foamed particles prepared by impregnating a polypropylene resin with a foaming agent and the particles are heated to fuse between them and secondarily foamed, thereby being molded into a desired shape and a method in which a polypropylene resin containing a foaming agent is heated, kneaded and extruded in the form of a sheet by means of an extruder to form a pre-foamed sheet, which is then subjected to hot press molding using a mold.

While the foam-molded articles obtained by these methods are excellent in heat insulating property and lightweight property, they are inferior in stiffness and mechanical strength and liable to be scratched on the surfaces.

JP-A 08-300391 discloses a method for increasing a mechanical strength of a foam-molded article, that is, a method in which a foaming material in a molten state is injected and filled into a cavity of a mold having a capacity of 10 to 95% based on a predetermined volume of a molded article and the cavity capacity is expanded up to the predetermined volume of the molded article to complete foaming while only the surface layer of the forming material contacting the mold is cooled to solidify and the inside thereof remains in a molten state, thereby providing a non-foamed layer on the surface of the molded article (hereinafter called a cavity expansion system foaming method).

Expansion of a cavity capacity in the middle of a molding step is achieved by sliding one side of a mold. Accordingly, when a box type molded article is to be obtained, a satisfactory foaming state is achieved at a bottom face part due to a large difference between the cavity thicknesses before and after sliding, but a non-foaming state is liable to be present at a side wall part.

Making use of such characteristics, JP-A 10-128795 proposes a method in which a non-foaming layer is provided on the surface of a main body part of a foam-molded article and a non-foamed rib part is provided.

However, because of a large difference in hardness between a main body part having a foamed layer and a non-foamed rib part, the foam-molded article obtained by the above method has the defect that crack or rupture is liable to be caused in a boundary between the main body part and the rib part when a force of impact or twist is applied.

In order to overcome this defect, it is conceivable that the inside of the rib part is allowed to be foamed by increasing a thickness of the rib part. This idea, however, is not advantageous in that the reduction in profitability caused by the increased weight is more significant than a reinforcing effect brought about by the resultant rib. For enhancing the reinforcing effect of a rib in molded articles of the same weight, it is more effective to provide a lot of ribs having a small thickness. Such a rib usually has a thickness of 3 mm or less, though in some specific cases exceeding 5 mm.

Further, increasing the amount of a forming agent to be added is one idea in order to allow the molded article to be foamed even inside the rib part. However, this is not practical because it may bring about bubbles of increased sizes and unevenness as well as a reduction in the number of independent bubbles, which will in turn result in a reduced strength and a poor appearance of the foam-molded article obtained.

SUMMARY OF THE INVENTION

An object of the present invention is to provide a polypropylene resin foam-molded article having a rib of a relatively small thickness in which the strength at a boundary part between a main body part and a rib part is improved without increasing a thickness of the rib part.

Intensive investigations repeated by the present inventors in order to solve the problems described above have resulted in finding that the object described above can be achieved by a polypropylene resin foam-molded article obtained by molding a material for a foam-molded article using a polypropylene resin, wherein the molded article comprises a main body part and a rib part; the rib part has a thickness ($T_r$) of 3 mm or less, or a thickness ratio ($T_r/T_b$) of a thickness of the rib part ($T_r$) to a thickness of the main body part ($T_b$) is 0.8 or less; the main body part and the rib part comprise a non-foamed surface layer and an intermediate layer having a foamed structure; and the intermediate layer in the main body part is connected to the intermediate layer in the rib part and that such a foam-molded article is obtained by molding a material for a foam-molded article using a polypropylene resin having specific MFR and melt tension. Thus, they have completed the present invention.

More specifically, the present invention is composed of the following aspects:

(1) A polypropylene resin foam-molded article obtained by molding a material for a foam-molded article using a polypropylene resin, wherein the molded article comprises a main body part and a rib part; the rib part has a thickness ($T_r$) of 3 mm or less, or a thickness ratio ($T_r/T_b$) of a thickness of the rib part ($T_r$) to a thickness of the main body part ($T_b$) is 0.8 or less; the main body part and the rib part each comprise a non-foamed surface layer and an intermediate layer having a foamed structure; and the intermediate layer in the main body part is connected to the intermediate layer in the rib part.

(2) The polypropylene resin foam-molded article as described in the above item (1), wherein the values of a melt flow rate (MFR) of the polypropylene resin and a melt tension (MS) thereof at 230° C. satisfy the following equation (I):

$$\log(MS) > 0.515 - 0.702 \times \log(MFR) \tag{I}$$

(3) The polypropylene resin foam-molded article as described in the above item (1) or (2), wherein the polypropylene resin is a polypropylene resin composition (A) comprising 0.01 to 5 parts by weight of an olefin (co)polymer (a) and 100 parts by weight of a propylene polymer (b); the olefin (co) polymer (a) has an intrinsic viscosity $[\eta]_E$ of 15 to 100 dl/g; and the polypropylene resin composition (A) has an intrinsic viscosity $[\eta]_T$ of 0.2 to 15 dl/g.

(4) The polypropylene resin foam-molded article as described in any of the above items (1) to (3), wherein the material for a foam-molded article is a mixture of the polypropylene resin composition (A) and other polypropylenes, the mixture comprising 5% by weight or more of the polypropylene resin composition (A).

(5) The polypropylene resin foam-molded article as described in any of the above items (1) to (4), wherein the material for a foam-molded article is molded by a cavity expansion system foaming method comprising a) an injection step, b) a primary cooling step, c) a foaming step and d) a secondary cooling step.

BRIEF DESCRIPTION OF THE DRAWINGS

FIG. 2 is an explanatory drawing of a molding method according to the present invention, wherein (i) shows the state of primary cooling after a molding material being injected and filled; (ii) shows the state of secondary cooling after a foaming step; and (iii) shows the state of opening a mold after secondary cooling.

EXPLANATION OF CODES

A: Foamed part (intermediate layer)
B: Non-foamed part (surface layer)
(1): Movable side of a mold
(2): Fixed side of a mold
(3): Gate
(4): Cavity
(5): Polypropylene resin foam-molded article
(6): Main body part
(7): Rib part
(8): Sprue

DETAILED DESCRIPTION OF THE PREFERED EMBODIMENTS

The embodiments of the present invention shall be explained below.

The polypropylene resin foam-molded article of the present invention is a foam-molded article obtained by molding a material for a foam-molded article using a polypropylene resin and comprises a main body part and a rib part. The main body part and the rib part comprise a non-foamed surface layer and an intermediate layer having a foamed structure, and the intermediate layer in the main body part is connected to the intermediate layer in the rib part.

An intermediate layer part in the rib part has a height of 1/10 to 9/10, preferably 1/10 to 4/5 of that of the rib extending from the main body part. Further, a thickness of the rib part ($T_r$) is a thickness of a part where the rib part is protruded from the main body part, and a thickness of the main body part ($T_b$) is a circumferential thickness of the main body part from which the rib part is protruded.

The polypropylene resin foam-molded article of the present invention has a rib part thickness ($T_r$) of 3 mm or less, preferably 1 to 2.5 mm, or a thickness ratio ($T_r/T_b$) of a rib part thickness ($T_r$) to a main body part thickness ($T_b$) is 0.8 or less, preferably 0.1 to 0.7. If the rib part thickness ($T_r$) exceeds 3 mm and the thickness ratio ($T_r/T_b$) exceeds 0.8, the reinforcing effect is not so much heightened as expected from an increased weight of the rib part, thus leading to economical inefficiency.

In the polypropylene resin foam-molded article of the present invention, a shape of the rib part including height and length shall not specifically be restricted and is suitably chosen depending on the uses and forms of the polypropylene resin foam-molded article. The presence of an intermediate layer in the rib part which is connected to an intermediate layer in the main body part may decrease a difference in hardness (flexibility) between the main body part and the rib part, whereby a resistance force against rupture in a boundary between both parts is enhanced when impact or twist is applied.

In the present invention, the "rib part" means not only a rib part usually provided so as to reinforce a molded article, but also protruding parts having various shapes including a side wall part and the like in a box type molded article.

Any combination of the main body part with the rib part may be acceptable; for instance, an article in which at least one linear rib part is provided on the surface of a planar main body part, a disc-like article in which a rib part is provided in the peripheral part of a disc-like main body part, or a box-like article in which a rib part is provided in the peripheral part of a square and planar main body part.

In the present invention, the term "non-foamed" means an absolutely nonfoamed state or a foamed state at an extremely low expansion ratio of 1.1 times or less. Further, the term "foamed" means a foamed state at an expansion ratio of more than 1.1 times, preferably 1.5 to 10 times.

In producing the polypropylene resin foam-molded article of the present invention, selection of the temperature and time in the primary cooling step makes it possible to adjust a thickness of the non-foamed surface layer.

In order to protect the surface of the main body part in the polypropylene resin foam-molded article from being scratched, the non-foamed surface layer has preferably a thickness of 0.2 mm or more. With a thickness of less than 0.2 mm, the reinforcing effect will sometimes be not satisfactory. It is possible to further increase the thickness of the non-foamed surface layer in order to enhance the strength of the foam-molded article. For example, when the cavity in the primary cooling step has a depth of 10 mm, it is possible to allow both surface layers to stay in a non-foaming state having a thickness of 4 mm and allow the middle of 2 mm to be foamed, thereby providing a foamed structure having a thickness of 15 mm. In general, the surface layer having a thickness exceeding 2 mm is not required for reinforcement.

In the polypropylene resin foam-molded article of the present invention, a thickness of the foamed intermediate layer shall not specifically be restricted and is suitably selected according to the uses of the polypropylene resin foam-molded article.

For the material for molding the polypropylene resin foam-molded article according to the present invention, suitably used is a polypropylene resin having a melt flow rate (hereinafter referred to as MFR; 230° C., 21.18N; unit: g/10 minute) and a melt tension (hereinafter referred to as MS; unit: cN) at 230° C. that satisfy the following equation (I):

$$\log(MS) > 0.515 - 0.702 \times \log(MFR) \tag{I}$$

Using such a polypropylene resin for the material, an intermediate layer having a foamed structure is formed as well in the rib part of the resulting polypropylene resin foam-molded article.

MFR and MS described above shall not specifically be restricted as long as they satisfy the above equation. With MFR of 0.5 g/10 minutes or more, preferably 1.0 to 50 g/10 minutes and MS of 0.5 cN or more, preferably 1.0 to 20 cN, the polypropylene resin foam-molded article will have good quality and productivity.

The polypropylene resin shall not specifically be restricted as long as it satisfies the above equation, and can be obtained, for example, by a method in which a linear polypropylene resin containing low molecular weight polypropylene and having an isotactic structure as a whole is mixed with a peroxide of a low temperature decomposition type (decomposition temperature: room temperature to about 120° C.) and heated to 120° C. or lower to combine again the linear polypropylene resin with low molecular weight polypropylene as a branched chain. Usually it is considered that the resultant polypropylene resin has a branched structure having a branched long chain primarily at the end of the linear polypropylene resin.

The above linear polypropylene resin includes propylene homopolymers and copolymers of propylene with other olefins. The other olefins copolymerizable with propylene include ethylene, 1-butene, isobutylene, 1-pentene, 3-methyl-1-butene, 1-hexene, 3,4-dimethyl-1-butene, 1-heptene and 3-methyl-1-hexene.

Further, given as the examples of the peroxide of a low temperature decomposition type described above are di(s-butyl)peroxy dicarbonate, bis(2-ethoxy)peroxy dicarbonate, dicyclohexylperoxy dicarbonate, di-n-propylperoxy dicarbonate, di-n-butylperoxy dicarbonate, diisopropylperoxy dicarbonate, t-butylperoxy neodecanoate, t-amylperoxy neodecanoate and t-butylperoxy pivalate.

The polypropylene resin described above is obtained by substituting the inside of a reactor equipped with a stirrer with inert gas such as argon while stirring the above described linear polypropylene resin having an isotactic structure in the reactor, then adding usually 5–50 millimoles of the above peroxide per kg of the resin, heating the mixture up to about 120° C., preferably to 70–105° C., while continuing stirring to react (usually 30–120 minutes) and then terminating the reaction. For terminating the reaction, a reaction stopper such as methylmercaptan is introduced into the reactor or the reaction product is heated to 130–150° C. for 20–40 minutes.

In the present invention, if the polypropylene resin used for the material for a foam-molded article is a polypropylene resin composition (A) comprising 0.01 to 5 parts by weight of an olefin (co)polymer (a) and 100 parts by weight of a propylene polymer (b), in which the olefin (co)polymer (a) has an intrinsic viscosity $[\eta]_E$ of 15 to 100 dl/g, preferably 17 to 50 dl/g, and the polypropylene resin composition (A) has an intrinsic viscosity $[\eta]_T$ of 0.2 to 15 dl/g, preferably 0.5 to 8 dl/g, the resulting polypropylene resin foam-molded article has homogeneous and minute independent bubbles and therefore is preferred.

The polypropylene resin composition (A) shall be explained below.

1. Olefin (Co)Polymer (a)

The olefin (co)polymer (a) which is a component of the polypropylene resin composition (A) may be any olefin (co)polymer as long as its intrinsic viscosity $[\eta]_E$ is 15 to 100 dl/g, and homopolymers or copolymers of olefins having 2 to 12 carbon atoms can be used. The specific examples of the olefins include ethylene, 1-butene, 1-pentene, 1-hexene, 1-octene, 1-decene, 4-methyl-1-pentene and 3-methyl-1-pentene. The preferred olefin (co)polymer (a) is an ethylene homopolymer or an ethylene-olefin random copolymer having 50% by weight or more of an ethylene polymerization unit.

The olefin (co)polymer (a) is a component which serves to elevate a melt tension of the polypropylene resin composition (A). If the olefin (co)polymer (a) has an intrinsic viscosity $[\eta]_E$ of less than 15 dl/g, a melt tension of the polypropylene resin composition (A) will be insufficient to produce minute and homogeneous bubbles and a foamed structure cannot be formed inside a base in the rib part of the polypropylene resin foam-molded article. Though no specific upper limit is set on the intrinsic viscosity $[\eta]_E$, the upper limit may lie in the vicinity of 100 dl/g from the viewpoints of dispersibility of the olefin (co)polymer (a) in the polypropylene resin composition (A) and the production efficiency.

A density of the olefin (co)polymer (a) shall not specifically be restricted and is preferably 0.880 to 0.980 g/cm³.

2. Propylene Polymer (b)

The propylene polymer (b) which is a component of the polypropylene resin composition (A) is such a propylene polymer that allows the polypropylene resin composition (A) to have an intrinsic viscosity $[\eta]_T$ ranging from 0.2 to 15 dl/g. The intrinsic viscosity $[\eta]_T$ of less than 0.2 dl/g or more than 15 dl/g will result in deteriorated moldability of the polypropylene resin foam-molded article.

Both of the intrinsic viscosity $[\eta]_E$ and the intrinsic viscosity $[\eta]_T$ are determined at 135° C. using tetralin as a solvent.

Suitably used as the propylene polymer (b) is at least one crystalline propylene polymer selected from propylene homopolymers, propylene-α-olefin block copolymers having 50% by weight or more of a propylene polymerization unit and propylene-olefin random copolymers having 90% by weight or more of an propylene polymerization unit.

The α-olefins described above shall not specifically be restricted and are preferably α-olefins having 2 to 12 carbon atoms excluding propylene. To be specific, they include ethylene, 1-butene, 1-pentene, 1-hexene, 1-octene, 1-decene, 4-methyl-1-pentene and 3-methyl-1-pentene. These α-olefins may be used alone or in combination of two or more thereof.

3. Composition Ratio

The polypropylene resin composition (A) used in the present invention comprises 0.01 to 5 parts by weight, preferably 0.02 to 2 parts by weight and more preferably 0.05 to 1 part by weight of the olefin (co)polymer (a) per 100 parts by weight of the polypropylene polymer (b).

If a content of the olefin (co)polymer (a) in the polypropylene resin composition (A) is less than 0.01 part by weight per 100 parts by weight of the polypropylene polymer (b), the polypropylene resin composition (A) will have an insufficient melt tension, and the foaming state in the polypropylene resin foam-molded article will become deteriorated. On the other hand, if it exceeds 5 parts by weight, not only an effect of elevating the melt tension will become saturated, but also a homogeneity of the resulting polypropylene resin composition (A) will sometimes be damaged.

The polypropylene resin composition (A) used in the present invention can be obtained by producing the olefin (co)polymer (a) and the polypropylene polymer (b) separately and then blending both of them in a prescribed proportion. In this connection, the method disclosed in International Publication WO97/14725 is preferable in that the respective components are finely dispersed in each other to produce a suitable composition. More specifically, the publication discloses a multistage polymerization method in which a catalyst for producing polyolefin prepared by combining a carrying type titanium-containing solid catalyst with an organic aluminum compound is used to prepare a prescribed amount of the olefin (co)polymer (a) and subsequently prepare a prescribed amount of the polypropylene polymer (b).

The multistage polymerization method described above is a production method comprising a pre-polymerization step (i) in which a small amount of propylene is polymerized in the presence of the catalyst for producing polyolefin described above, a preliminary activation step (ii) in which olefin is then (co)polymerized to produce an olefin (co) polymer (a), an addition polymerization step (iii) in which remaining olefin and propylene are polymerized if necessary, and a step (iv) in which a propylene polymer (b) is produced in the presence of the pre-activation catalyst thus obtained.

After completion of the above step (iv), and if necessary, going through after-treatment steps known in the art such as steps of deactivation of the catalyst, removal of a catalyst residue and drying or the like, the intended polypropylene resin composition (A) is obtained.

The polypropylene resin composition (A) obtained in the manner described above can be used alone as it is or in a mixture with other polypropylenes for the material for a foam-molded article for molding the polypropylene resin foam-molded article of the present invention.

When the polypropylene resin composition (A) is used in a mixture with other polypropylenes, an amount of the polypropylene resin composition (A) contained in the mixture is varied depending on the form of the polypropylene resin foam-molded article produced and is 5% by weight or more, preferably 20% by weight or more and more preferably 50% by weight or more.

In this case, any conventional polypropylenes such as propylene homopolymers and propylene-ethylene copolymers can be used as other polypropylenes which can be used in a mixture with the polypropylene resin composition (A).

The polypropylene resin composition (A) or the mixture of the polypropylene resin composition (A) and the other polypropylenes described above can be blended, if necessary, with additives commonly used for polypropylene, such as antioxidants, UV absorbers, lubricants, antistatic agents, colorants and flame retardants and, if further necessary, fillers such as glass fibers, talc and mica each in a suitable amount.

0.5 to 5% by weight of a foaming agent is added to the polypropylene resin composition (A) or the mixture described above prior to molding to prepare the material for a foam-molded article.

The foaming agent can be added by dry-blending by means of a tumbler mixer or melting, kneading and pelletizing a blended matter at a temperature at which the foaming agent is not decomposed.

Examples of the foaming agent include ammonium carbonate, sodium hydrogencarbonate, dihydrogen monosodium citrate, azodicarbonamide (ADCA), 2,2'-azoisobutyronitrile, azohexahydrobenzonitrile, diazoaminobenzene, benzenesulfohydrazide, benzene-1,3-disulfohydrazide, diphenylsulfone-3,3-disulfohydrazide, diphenyloxide-4,4-disulfohydrazide, N,N'-dinitrosopentamethylenetetramine, N,N'-dimethyl terephthalate, terephthalazide and p-t-butylbenzazide.

The polypropylene resin foam-molded article of the present invention can be produced by the method exemplified below using the above-mentioned material for a foam-molded article. The method is an injection molding method (cavity expansion system foaming method) using an injection molding machine equipped with a heating cylinder and a mold and comprising a) an injection step, b) a primary cooling step, c) a foaming step and d) a secondary cooling step.

a) Injection Step:

In the injection step, the material for a foam-molded article which has been molten in a heating cylinder is injected and filled into a cavity of a mold having a capacity of 10 to 95% of a predetermined volume of the polypropylene resin foam-molded article.

In this case, a preset temperature of a tip part (nozzle side) higher than that of a rear part (hopper side) in the heating cylinder makes it possible to inhibit the material for a foam-molded article from being foamed in the cylinder and thus inject the material in a non-foaming state into the cavity. A difference in preset temperatures between the tip part and the rear part is 20 to 100° C., preferably 20 to 70° C. and more preferably 30 to 60° C.

Further, in order to inhibit the material for a foam-molded article from being foamed in the cylinder, a back pressure of the heating cylinder is set to 5 MPa or more, preferably 7 MPa or more and more preferably 10 MPa or more.

If a cavity capacity of the mold is less than 10% of a predetermined volume of the polypropylene resin foam-molded article, a gradient of pressure applied to the polypropylene resin foam-molded article in the injection step is too large, and homogeneous filling is sometimes difficult to attain. On the other hand, if the mold has a cavity capacity of exceeding 95% of a predetermined volume of the polypropylene resin foam-molded article, the molten material for a foam-molded article begins to foam in the injection step, and a good non-foamed layer is not obtained on the surface of the polypropylene resin foam-molded article.

b) Primary Cooling Step:

The material for a foam-molded article filled into the mold in the preceding step is cooled down until only the surface layer contacting the mold is solidified and the inside remains in a molten state. To be specific, this is carried out by holding the mold charged with the material for a fixed time without changing the capacity thereof. The holding time is experimentally decided according to the mold temperature, the kind of the material for a foam-molded article, the form of the polypropylene resin foam-molded article and a thickness of the non-foamed layer, and it is usually 1 to 20 seconds. A preferred thickness of the non-foamed layer is about 0.2 to 2 mm.

c) Foaming Step:

After finishing the primary cooling step, the cavity of the mold is expanded until its capacity comes to the predetermined volume of the foam-molded article, thereby foaming the material for a foam-molded article staying in a molten state. The cavity can be expanded by methods well known in the art such as moving of the mold by a clamping mechanism in an injection molding machine or moving of a slide core provided in the mold.

d) Secondary Cooling Step:

The secondary cooling step is carried out by holding the expanded mold without changing the capacity thereof until the form of the polypropylene resin foam-molded article is stabilized. Time required for the secondary cooling is varied depending on the forms of the polypropylene resin foam-molded article and therefore is experimentally decided.

After finishing the secondary cooling step, the mold is opened to take out the polypropylene resin foam-molded article.

EXAMPLES

The present invention shall more specifically be explained with reference to examples and comparative examples.

Test methods used in the examples and the comparative examples shall be described below.

1) Intrinsic viscosity [η]:

The viscosity was determined, using Tetralin (tetrahydronaphthalene) as a solvent, under a temperature condition of 135° C. by means of an automatic viscosity-measuring apparatus (model AVS2, manufactured by Mitsui Toatsu Chemical Ind. Co., Ltd.) (unit:dl/g).

2) Melt Flow Rate (MFR):

Measured based on JIS K7210, Condition 14 in Table 1 (test temperature: 230° C., test load: 21.18N) (unit: g/10 min).

3) Melt Tension:

A melt tension tester Model 2 manufactured by Toyo Seiki Seisaku-Sho, Ltd. was used to extrude the resin molten by heating at 230° C. from an orifice having a diameter of 2.095 mm and a length of 40 mm at a rate of 20 mm/min to obtain a strand and the tension was determined when this strand is drawn at a rate of 3.14 m/min (unit: cN).

4) Foaming State:

Visually observed.

5) Foaming magnification:

A specific gravity ($d_2$) of a test piece cut from the polypropylene resin foam-molded article was measured and a ratio of $d_2$ to a specific gravity ($d_1$) of the material for a foam-molded article was obtained to determine the foaming magnification:

$$\text{Foaming magnification} = d_1/d_2$$

Figure 3:
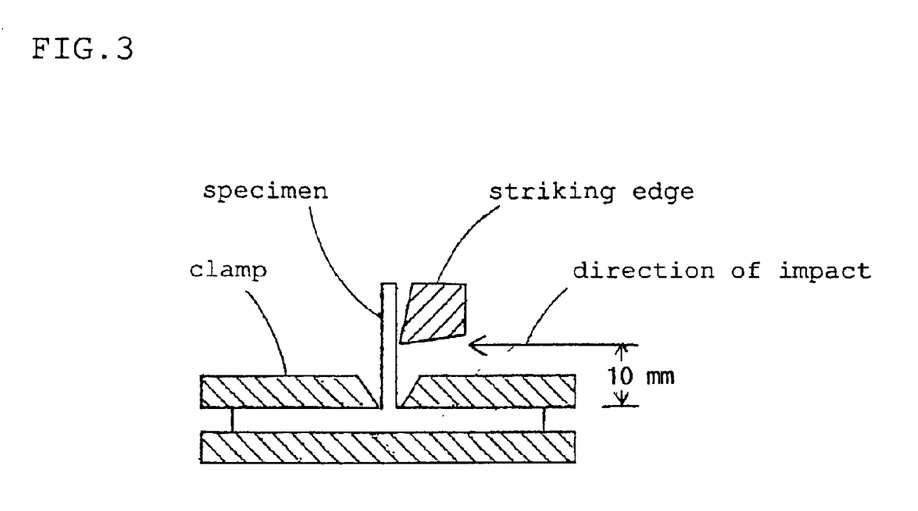
FIG. 3 is an explanatory drawing of an impact test on a rib part.

6) Impact Test:

An Izod impact tester was used to hit a position of a rib part at a height of 10 mm from a main body part of a convex test specimen. The presence of rupture in the rib part was observed and energy (absorbed energy) required for rupture or deformation was determined. The test specimen for this impact test was mounted as shown in FIG. 3.

Production of Polypropylene Resin Composition (A)

The polypropylene resin composition (A) was produced by a method disclosed in International Publication WO97/14725, in which a catalyst for producing polyolefin prepared by combining a carrying type titanium-containing solid catalyst with an organic aluminum compound is used to produce a prescribed amount of the olefin (co)polymer (a) and subsequently produce a prescribed amount of the polypropylene polymer (b) The production conditions and the like were varied to obtain three kinds of the polypropylene resin compositions (A)-1, (A)-2 and (A)-3. The properties thereof are shown in Table 1.

Example 1

To 4 kg of the polypropylene resin composition (A)-1 described above were added 0.004 kg of 1,1,3-tris(2-methyl-4-hydroxy-5-t-butylphenyl)butane, 0.004 kg of calcium stearate and 0.06 kg of azodicarbonamide, and the mixture was blended by means of a tumbler mixer to prepare a material for a foam-molded article.

Figure 2:
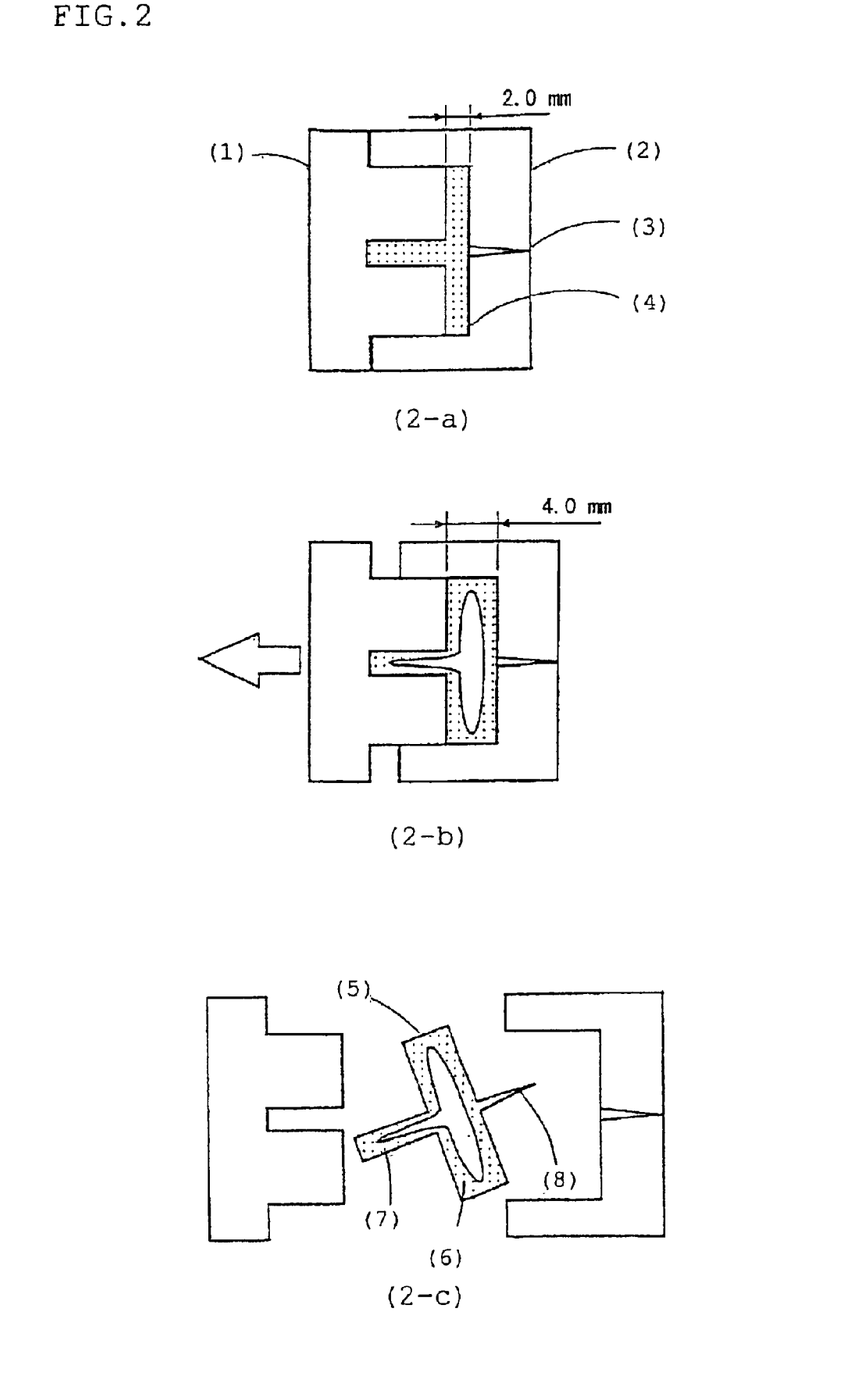

Used was an injection molding machine equipped with a heating cylinder having a screw diameter of 50 mm and a clamp-controlling mechanism and having a maximum clamping force of 300 tons. The temperatures of the respective heating zones in the heating cylinder were set to 230° C., 230° C., 230° C., 210° C. and 180° C. in order from the tip part to the rear part; the back pressure was set to 9.8 MPa; and a mold-cooling water temperature was set to 40° C. 19 g of the heated and molten material for a foam-molded article was injected and filled into the cavity in which a space between the movable side of a mold corresponding to a main body part (bottom) of a convex molded article and the fixed side of a mold was 2.0 mm and whose capacity was 21 cm³. After completing the injection, the mold was primarily cooled for 10 seconds, and then the movable side of the mold was allowed to go back by 2.0 mm to expand the cavity capacity to 36 cm³ to foam the material therein (FIG. 2). Then, the mold was secondarily cooled for 60 seconds to obtain a polypropylene resin foam-molded article.

Figure 1:
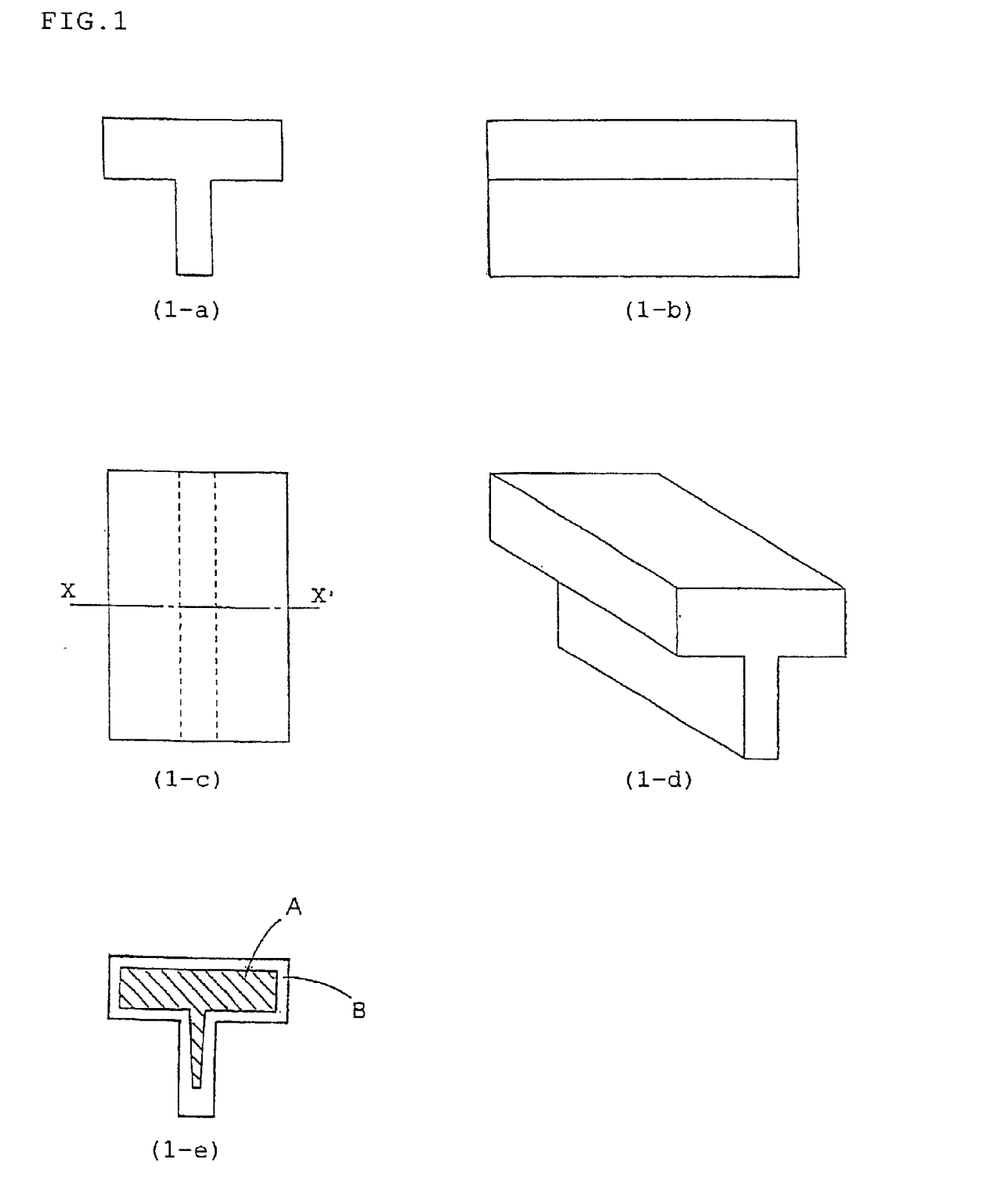
FIG. 1 is an explanatory drawing of a polypropylene resin foam-molded article obtained in the later-described Examples, wherein (1-a) is a front view; (1-b) is a side view; (1-c) is a top view; (1-d) is a perspective view; and (1-e) is a sectional view on X–X' line.

The schematic drawings of the polypropylene resin foam-molded article thus obtained are shown in FIGS. 1 and 2, in which the main body part (thickness ($T_b$): 4.0 mm, width: 50 mm and expansion ratio: 2.0 times) of the convex polypropylene resin foam-molded article comprises a surface layer comprising a non-foamed part having a thickness of 0.5 mm and an intermediate layer comprising a foamed part, and in which a rib part (thickness ($T_r$): 2.0 mm, height: 20 mm) is provided in such a manner that it stands up vertically on the main body part, and an intermediate layer connecting to the intermediate layer of the main body part has been formed up to a height of 15 mm from the position where the rib part contacts the main body part.

For an impact test, five specimens each having a width of 25 mm were cut from the polypropylene resin foam-molded article perpendicular to a longitudinal direction thereof (parallel to an X–X' line in FIG. 1). The test specimen was mounted in an Izod impact tester in such a manner that an impact point of a hammer was positioned on a side face of the rib part, upwardly 10 mm distant from the main body part. As a result of the impact test, the rib part was bent without being broken, with the striking edge passing through the bent rib part. The absorbed energy in the test was 0.71 J. These evaluation results are shown in Table 2.

Example 2

A convex polypropylene resin foam-molded article was obtained in the same manner as in Example 1, except that the polypropylene resin composition (A)-2 was used for the material for a foam-molded article in place of the polypropylene resin composition (A)-1.

The main body part of this polypropylene resin foam-molded article comprises a surface layer comprising a non-foamed part having a thickness of 0.5 mm and an intermediate layer comprising a foamed part (expansion ratio: 2.0 times), and in a rib part, an intermediate layer connecting to the intermediate layer of the main body part has been formed up to a height of 15 mm from the position where the rib part contacts the main body part.

As a result of the impact test, the rib part was not broken, and the absorbed energy in the test was 0.68 J. These evaluation results are shown in Table 2.

Example 3

A convex polypropylene resin foam-molded article was obtained in the same manner as in Example 1, except that the polypropylene resin composition (A)-3 was used for the material for a foam-molded article in place of the polypropylene resin composition (A)-1.

The main body part of this polypropylene resin foam-molded article comprises a surface layer comprising a non-foamed part having a thickness of 0.5 mm and an intermediate layer comprising a foamed part (expansion ratio: 2.0 times), and in a rib part, an intermediate layer connecting to the intermediate layer of the main body part has been formed up to a height of 15 mm from the position where the rib part contacts the main body part.

As a result of the impact test, the rib part was not broken, and an absorbed energy in the test was 0.68 J. These evaluation results are shown in Table 2.

Example 4

A convex polypropylene resin foam-molded article was obtained in the same manner as in Example 1, except that a polypropylene resin Himont PF-814 (manufactured by Himont-Co., Ltd.; Refer to Table 1.) was used for the material for a foam-molded article in place of the polypropylene resin composition (A)-1.

The main body part of this polypropylene resin foam-molded article comprises a surface layer comprising a non-foamed part having a thickness of 0.5 mm and an intermediate layer comprising a foamed part (expansion ratio: 2.0 times), and in a rib part, an intermediate layer connecting to the intermediate layer of the main body part has been formed up to a height of 15 mm from the position where the rib part contacts the main body part.

As a result of the impact test, the rib part was not broken, and an absorbed energy in the test was 0.70 J. These evaluation results are shown in Table 2.

Example 5

A convex polypropylene resin foam-molded article was obtained in the same manner as in Example 1, except that a mixture of the polypropylene resin composition (A)-1 and a polypropylene resin Chisso Polypro K1016 (manufactured by Chisso Corporation; Refer to Table 1.) (mixing weight ratio, 20:80) was used in place of the polypropylene resin composition (A)-1.

The main body part of this polypropylene resin foam-molded article comprises a surface layer comprising a non-foamed part having a thickness of 0.5 mm and an intermediate layer comprising a foamed part (expansion ratio: 2.0 times), and in a rib part, an intermediate layer connecting to the intermediate layer of the main body part has been formed up to a height of 10 mm from the position where the rib part contacts the main body part.

As a result of the impact test, the rib part was not broken, and an absorbed energy in the test was 0.60 J.

Comparative Example 1

A convex polypropylene resin foam-molded article was obtained in the same manner as in Example 1, except that a polypropylene resin Chisso Polypro K1016 (manufactured by Chisso Corporation; Refer to Table 1.) was used in place of the polypropylene resin composition (A)-1.

The main body part of this polypropylene resin foam-molded article comprises a surface layer comprising a non-foamed part having a thickness of 0.5 mm and an intermediate layer comprising a foamed part (expansion ratio: 2.0 times). A foaming state was not observed inside the rib part.

As a result of the impact test, the rib part was broken, and an absorbed energy in the test was 0.50 J. These evaluation results are shown in Table 2.

TABLE 1

| | Polypropylene resin composition (A) | | | Himont | Chisso |
|---|---|---|---|---|---|
| | -1 | -2 | -3 | PF-814 | Polypro K1016 |
| Polypropylene resin | | | | | |
| Melt flow rate (MFR) g/10 min | 6.0 | 15.4 | 36.0 | 2.0 | 6.0 |
| Melt tension cN | 2.5 | 1.4 | 14 | 14 | 0.8 |
| Compatibility with equation (I) | Compatible | Compatible | Compatible | Compatible | Incompatible |
| Intrinsic viscosity $[\eta]_T$ dl/g | 1.80 | 1.54 | 1.35 | — | 1.68 |
| Olefin (co)polymer (a) | | | | | |
| Kind of olefin | Ethylene | Ethylene | Ethylene | — | — |
| Intrinsic viscosity $[\eta]_E$ dl/g | 30.2 | 22.5 | 30.2 | — | — |
| Content in composition (A) wt % | 0.18 | 0.12 | 0.18 | — | — |
| Propylene polymer (b) | | | | | |
| Ethylene/propylene weight ratio | 0/100 | 0.8/99.2 | 0/100 | — | — |

TABLE 2

| | Example | | | | | Comparative Example |
|---|---|---|---|---|---|---|
| | 1 | 2 | 3 | 4 | 5 | 1 |
| Resin for material for foam-molded article | | | | | | |
| Polypropylene resin composition (A)-1 | 100 | | | | 20 | |
| Polypropylene resin composition (A)-2 | | 100 | | | | |
| Polypropylene resin composition (A)-3 | | | 100 | | | |
| Himont PF-814 | | | | 100 | | |
| Chisso Polypro K1016 | | | | | 80 | 100 |

TABLE 2-continued

|  | Example | | | | | Comparative Example |
|---|---|---|---|---|---|---|
|  | 1 | 2 | 3 | 4 | 5 | 1 |
| State of rib part in foam-molded article | | | | | | |
| Presence of intermediate layer-containing part | Present | Present | Present | Present | Present | None |
| Height of intermediate layer-containing part | 15 | 15 | 15 | 15 | 10 | — |
| Impact test | | | | | | |
| Rupture state | Rib part bent | Rib part bent | Rib part bent | Rib part bent | Rib part bent | Rib part broken |
| Absorbed energy | 0.71 | 0.68 | 0.68 | 0.70 | 0.60 | 0.50 |

Effects of the Invention

In the polypropylene resin foam-molded article of the present invention, a main body part and a rib part each comprises a non-foamed surface layer and an intermediate layer having a foamed structure, and the intermediate layers of both parts are connected. This enables the polypropylene resin foam-molded article to have an improved strength in a boundary part between the main body part and the rib part.

What is claimed is:

1. A polypropylene resin foam-molded article obtained by molding a material for a foam-molded article using a polypropylene resin, wherein the molded article comprises a main body part and a rib part; the rib part has a thickness ($T_r$) of 3 mm or less, or a thickness ratio ($T_r/T_b$) of a thickness of the rib part ($T_r$) to a thickness of the main body part ($T_b$) is 0.8 or less; the main body part and the rib part each comprise a non-foamed surface layer and an intermediate layer having a foamed structure, the non-foamed surface layer and intermediate layer comprising the same material; and the foamed intermediate layer in the main body part is connected to the foamed intermediate layer in the rib part and the foamed intermediate layer is encased in the non-foamed surface layer.

2. The polypropylene resin foam-molded article according to claim 1, wherein the values of a melt flow rate (MFR) of the polypropylene resin and a melt tension (MS) thereof at 230° C. satisfy the following equation (I):

$$\log(MS) > 0.515 - 0.702 \times \log(MFR) \qquad (I).$$

3. The polypropylene resin foam-molded article according to claim 1, wherein the polypropylene resin is a polypropylene resin composition (A) comprising 0.01 to 5 parts by weight of an olefin (co)polymer (a) and 100 parts by weight of a propylene polymer (b); the olefin (co)polymer (a) has an intrinsic viscosity $[f]_E$ of 15 to 100 dl/g; and the polypropylene resin composition (A) has an intrinsic viscosity $[\eta]_T$ of 0.2 to 15 dl/g.

4. The polypropylene resin composition foam-molded article according to claim 1, wherein the material for a foam-molded article is a mixture of a polypropylene resin composition (A) and other polypropylenes, the mixture comprising 5% by weight or more of the polypropylene resin composition (A), wherein the polypropylene resin composition (A) comprises 0.01 to 5 parts by weight of an olefin copolymer and 100 parts by weight of a propylene polymer, the olefin copolymer having an intrinsic viscosity $[\eta]_E$ of 15 to 100 dl/g, and the polypropylene resin composition (A) having an intrinsic viscosity $[\eta]_T$ of 0.2 to 15 dl/g.

5. The polypropylene resin foam-molded article according to claim 1, wherein the material for a foam-molded article is molded by a cavity expansion system foaming method comprising a) an injection step, b) a primary cooling step, c) a foaming step and d) a secondary cooling step.

6. The polypropylene resin foam-molded article according to claim 1, wherein the non-foamed surface layer is integrally molded with the foamed intermediate layer.

7. The polypropylene resin foam-molded article according to claim 1, wherein the non-foamed surface layer and foamed intermediate layer form a unitary article.

* * * * *